United States Patent
Lee et al.

(10) Patent No.: US 8,467,202 B2
(45) Date of Patent: Jun. 18, 2013

(54) FLYBACK POWER SUPPLY SYSTEM

(75) Inventors: Chi-Hsiung Lee, Jhongli (TW);
Chien-Chieh Tai, Jhongli (TW);
Hung-Yi Chen, Jhongli (TW)

(73) Assignee: Ampower Technology Co., Ltd.,
Jhongli, Taoyuan County (TW)

( * ) Notice: Subject to any disclaimer, the term of this patent is extended or adjusted under 35 U.S.C. 154(b) by 233 days.

(21) Appl. No.: 13/072,764

(22) Filed: Mar. 27, 2011

(65) Prior Publication Data
US 2012/0188801 A1 Jul. 26, 2012

(51) Int. Cl.
*H02M 3/335* (2006.01)
*H02J 1/10* (2006.01)

(52) U.S. Cl.
USPC ......................... 363/21.12; 363/72

(58) Field of Classification Search
USPC .............. 363/21.13, 26, 41, 71–72, 21.12
See application file for complete search history.

(56) References Cited

U.S. PATENT DOCUMENTS

| | | | |
|---|---|---|---|
| 3,571,692 A * | 3/1971 | Andren | 363/16 |
| 4,174,534 A * | 11/1979 | Kotlarewsky | 363/26 |
| 5,130,561 A * | 7/1992 | Elliott et al. | 307/31 |
| 5,309,348 A * | 5/1994 | Leu | 363/71 |
| 5,369,564 A * | 11/1994 | Choi | 363/71 |
| 5,453,921 A * | 9/1995 | Shutts | 363/21.18 |
| 5,796,595 A * | 8/1998 | Cross | 363/71 |
| 6,262,901 B1 * | 7/2001 | Simopoulos | 363/72 |
| 7,671,486 B2 * | 3/2010 | Yang | 307/31 |
| 2006/0139978 A1 * | 6/2006 | Hsieh et al. | 363/71 |
| 2010/0165668 A1 * | 7/2010 | Lin | 363/21.02 |

* cited by examiner

*Primary Examiner* — Bao Q Vu
*Assistant Examiner* — Yusef Ahmed
(74) *Attorney, Agent, or Firm* — Altis Law Group, Inc.

(57) ABSTRACT

A flyback power system includes a rectifier and filter circuit, a pulse width modulation (PWM) controller, a feedback circuit, a master converter circuit, a slave converter circuit, and a slave converter control circuit. The master converter circuit continuously converts power signals from the rectifier and filter circuit into first direct current (DC) power signals to drive load according to PWM signals of the PWM controller when the flyback power system powered on. The slave converter circuit converts the power signals from the rectifier and filter circuit into second DC power signals according to the PWM signals, and superposes the second DC power signals to the first DC power signals to drive the load when the load is heavy. The slave converter control circuit detects whether the load is heavy, and controls the PWM signals whether to input into the slave converter circuit according to a state of the load.

20 Claims, 5 Drawing Sheets

FLYBACK POWER SUPPLY SYSTEM

BACKGROUND

1. Technical Field

The disclosure relates to power systems, and particularly to a flyback power system.

2. Description of Related Art

In flyback power systems, a transformer, rectifier circuits and a feedback circuit are used to control output voltage/current. The transformer is used for both power step-up/step-down and isolation, which results in the transformer to be big in size. Thus, it is difficult to miniaturize the flyback power systems. In addition, because an effective on period of the transformer is short, power loss of the flyback power systems is high when there is a light load or no load of the flyback power system.

DETAILED DESCRIPTION

Figure 1:
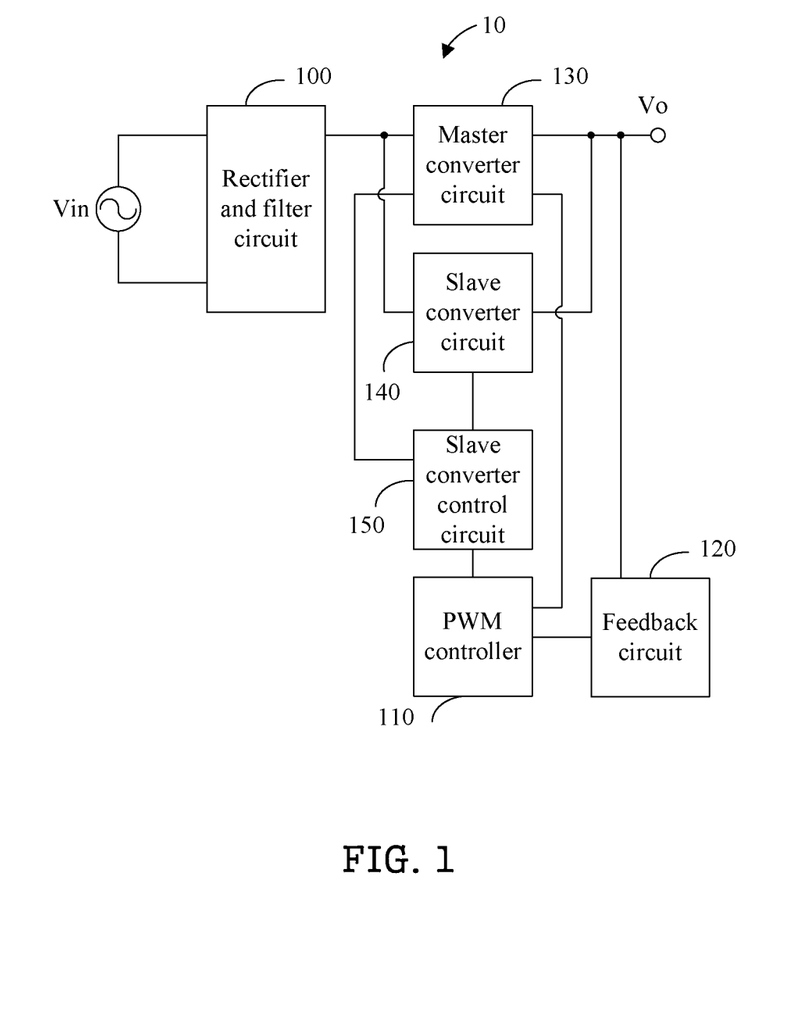
FIG. 1 is a schematic diagram of one embodiment of a flyback power system as disclosed.

FIG. 1 is a schematic diagram of one embodiment of a flyback power system 10 as disclosed. In one embodiment, the flyback power system 10 converts alternating current (AC) power signals Vin into direct current (DC) power signals Vo to drive a load in a device. In one embodiment, the device may a notebook computer, and the load includes backlight lamps and work circuits of the device. The AC power signals Vin may be commercial power of 220V. The flyback power system 10 includes a rectifier and filter circuit 100, a pulse width modulation (PWM) controller 110, a feedback circuit 120, a master converter circuit 130, a slave converter circuit 140, and a slave converter control circuit 150. The rectifier and filter circuit 100 rectifies and filters the AC power signals Vin, and includes full bridge rectifier circuit and a filter capacitor. In one embodiment, power signals output from the rectifier and filter circuit 100 are DC signals with amplitude being 200 to 330V, such as 311V. The feedback circuit 120 generates a feedback signal according to the DC power signals Vo, and sends the feedback signal to the PWM controller 110.

The PWM controller 110 generates PWM signals corresponding to the feedback signal and a load state to control the master converter circuit 130 and the slave converter circuit 140. In one embodiment, the load state represents an operating state of the device, and includes whether the load is heavy or light or if there are no loads connected to the flyback power system 10. If a predetermined number of circuits of the device are running and the backlight lamps are lit, the load is heavy. The predetermined number can be set according to actual needs. If only a few circuits of the device are running, the load is light. If none circuits of the device is running and the backlight lamps are powered down, there is no load, that is, the device is idle. When all the circuit of the device are running and the backlight lamps are lit at the same time, the device has a maximum tolerance load. If an actual load exceeds a predetermined scale of maximum tolerance load, then the actual load is heavy. The predetermined scale may be set and adjusted according to actual needs, for example, may be 40%. If the actual load exceeds the maximum tolerance load, the flyback power system 10 cannot work normally.

The master converter circuit 130 converts the power signals output from the rectifier and filter circuit 100 into first DC power signals to drive the load according to the PWM signals of the PWM controller 110. When the flyback power system 10 is powered on, the master converter circuit 130 continuously converts the power signals output from the rectifier and filter circuit 100 into the first DC power signals.

The slave converter circuit 140 converts the power signals output from the rectifier and filter circuit 100 into second DC power signals according to the PWM signals of the PWM controller 110, and superposes the second DC power signals to the first DC power signals to drive the load when the load is heavy. At this time, the DC power signals Vo are a superposition of the first and second DC power signals. When the load is light or there is no load, the slave converter circuit 140 does not operate, and at this time, the DC power signals Vo are the first DC power signals.

The slave converter control circuit 150 is connected between the slave converter circuit 140 and the PWM controller 110, and controls operation of the slave converter circuit 140. The slave converter control circuit 150 detects whether the load is heavy, and controls the PWM signals of the PWM controller 110 to input to the slave converter circuit 140 to make the slave converter circuit 140 to drives the load commonly with the master converter circuit 130 if the load is heavy. If the load is light or there is no load, the slave converter control circuit 150 stops inputting the PWM signals of the PWM controller 110 into the slave converter circuit 140. Thus, at this time, the master converter circuit 130 independently drives the load.

Thus, under control of the slave converter control circuit 150, the slave converter circuit 140 only works when the load is heavy to commonly drive the load with the master converter circuit 130 to provide enough power. When the load is light or there is no load, the slave converter circuit 140 does not work, and the master converter circuit 150 drives the load itself. Thus, the flyback power system 10 has low power loss and high efficiency.

Figure 2:
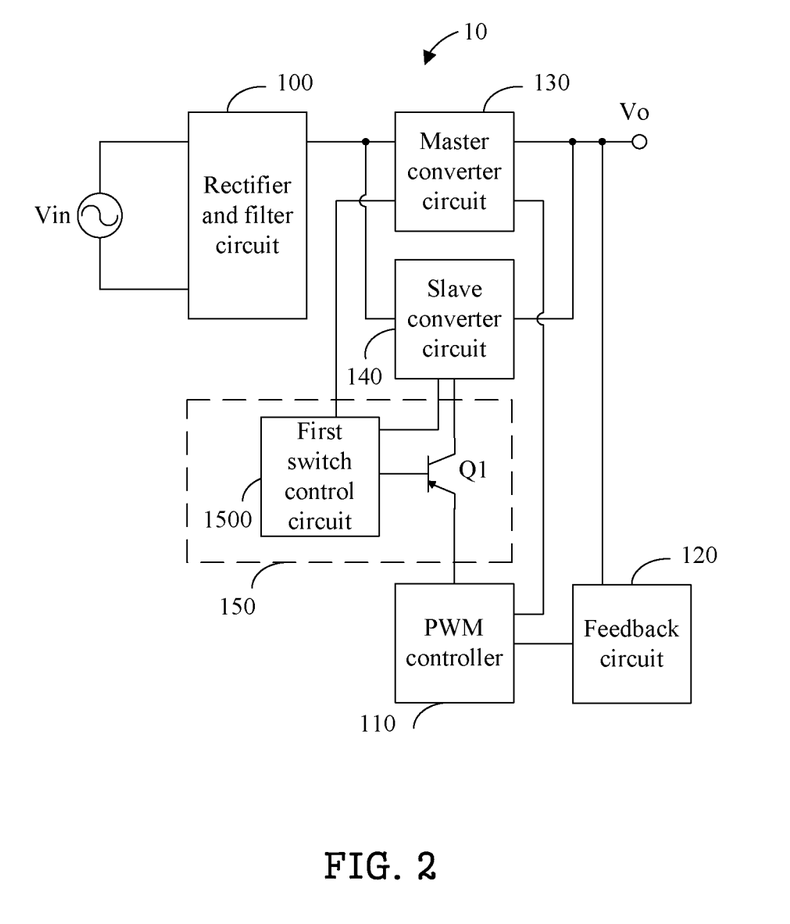
FIG. 2 is a schematic diagram of another embodiment of a flyback power system as disclosed.

FIG. 2 is a schematic diagram of another embodiment of the flyback power system 10. The slave converter control circuit 150 of the flyback power system 100 includes a first switch Q1 and a first switch control circuit 1500. The first switch Q1 includes a control pole, a first pole, and a second pole. The first pole is connected to the PWM controller 110, the second pole is connected to the slave converter circuit 140, and the control pole is connected to the first switch control circuit 1500. The first switch control circuit 1500 detects whether the load is heavy, and turns on the first switch Q1 to control the PWM signals of the PWM controller 110 to input into the slave converter circuit 140 if the load is heavy, or turns off the first switch Q1 to stop inputting the PWM signals into the slave converter circuit 140 if the load is light or there is no load. Thus, when the load is heavy, the slave converter circuit 140 converts the power signals output from the rectifier and filter circuit 100 into the second DC power signals according to the PWM signals. When the load is light or there is no load, the slave converter circuit 140 does not converter the power signals output from the rectifier and filter circuit 100.

Figure 3:
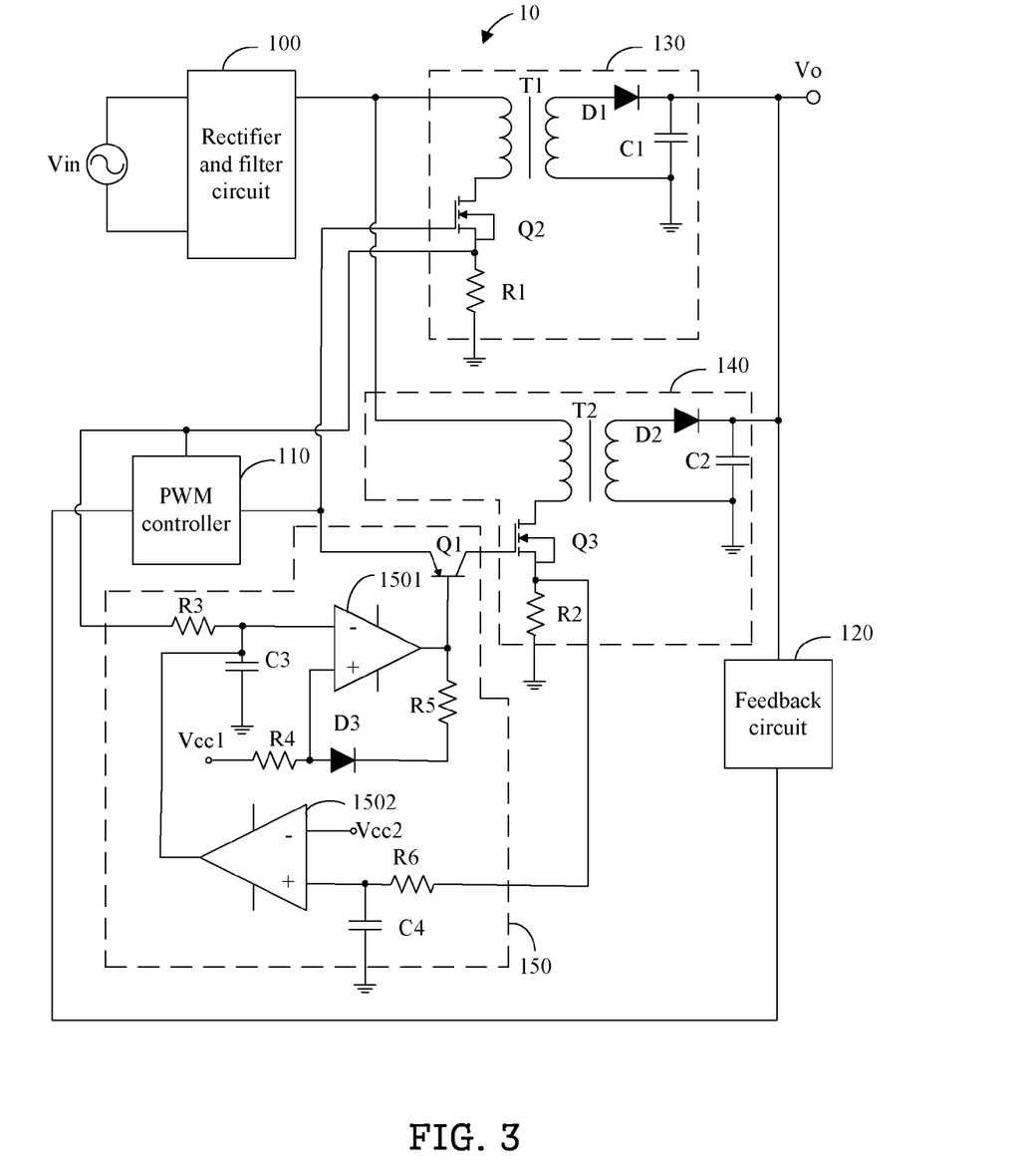
FIG. 3 is a circuit diagram of a first embodiment of a flyback power system as disclosed.

FIG. 3 is a circuit diagram of a first embodiment of the flyback power system 10 as disclosed. The master converter circuit 130 includes a first transformer T1, a second switch Q2, and a first resistor R1. The first transformer T1 includes a primary winding and a secondary winding, and a high voltage terminal of the primary winding is connected to the rectifier and filter circuit 100. The second switch Q2 includes a control pole, a first pole, and a second pole. The control pole of the second switch Q2 is connected to the PWM controller 110 to receive the PWM signals, the first pole of the second switch Q2 is connected to a low voltage terminal of the primary winding of the first transformer T1, and the second pole of the second switch Q2 is connected to the ground via the first resistor R1. That is, the primary winding of the first transformer T1, the second switch Q2, and the first resistor R1 are connected in series between an output of the rectifier and filter circuit and the ground in turn.

The second switch Q2 is controlled by the PWM signals of the PWM controller 110, and is turned on or off according to the PWM signals. Thus, the first transformer T1 converts the power signals output from the rectifier and filter circuit 100 into first square wave signals.

In one embodiment, the master converter circuit 130 further includes a first diode D1 and a first capacitor C1. The first diode D1 rectifies the first square wave signals from the first transformer T1. An anode of the first diode D1 is connected to a high voltage terminal of the secondary winding of the first transformer T1, and a cathode of the first diode D1 outputs the first DC power signals. The first capacitor C1 is connected between the cathode of the first diode D1 and the ground, and filters the square wave signals from the first transformer T1.

The slave converter circuit 140 includes a second transformer T2, a third switch Q3, and a second resistor R2. The second transformer T2 includes a primary winding and a secondary winding, and a high voltage terminal of the primary winding of the second transformer T2 is connected to the rectifier and filter circuit 100. The third switch Q3 is connected to the salve converter control circuit 150, receives the PWM signals if the slave converter control circuit 150 controls the PWM signals to input into the salve converter circuit 140, and turns on or off according to the PWM signals. Thus, the second transformer T2 converts the power signals from the rectifier and filter circuit 100 into second square wave signals. The third switch Q3 includes a control pole, a first pole, and a second pole. The control pole of the third switch Q3 is connected to the second pole of the first switch Q1 of the slave converter control circuit 150, the first pole of the third switch Q3 is connected to a low voltage terminal of the primary winding of the second transformer T2, and the second pole of the third switch Q3 is connected to the ground via the second resistor R2. That is, the primary winding of the second transformer T2, the third switch Q3, and the second resistor R2 are connected in series between the output of the rectifier and filter circuit 100 and the ground in turn.

In one embodiment, the slave converter circuit 140 further includes a second diode D2 and a second capacitor C2. The first diode D1 rectifies the first square wave signals from the first transformer T1. An anode of the second diode D2 is connected to a high voltage terminal of the secondary winding of the second transformer T2, and a cathode of the second diode D2 outputs the second DC power signals. The second capacitor C2 is connected between the cathode of the second diode D2 and the ground, and filters the square wave signals from the second transformer T2.

In one embodiment, the first switch Q1 is a transistor of pnp type, the control pole of the first switch Q1 is a base, the first pole of the first switch Q1 is an emitter, and the second pole of the first switch Q1 is a collector. The second switch Q2 and the third switch Q3 are both metallic oxide semiconductor field effect transistors (MOSFET) of n type, the control poles of the second switch Q2 and the third switch Q3 are gates, the first poles of the second switch Q2 and the third switch Q3 are drains, and the second poles of the second switch Q2 and the third switch Q3 are sources.

The first switch control circuit 1500 of the slave converter control circuit 150 is connected to the second poles of the second switch Q2 and the third switch Q3, and detects voltage on the first resistor R1 and/or the second resistor R2 to determine whether the load is heavy. In one embodiment, if actual load exceed a predetermined scale of maximum tolerance load, the actual load is heavy. The predetermined scale can be set and adjusted according to actual needs, such as, being 30% or 40%. The maximum tolerance load is maximum load that the flyback power system 10 can drive. The first switch control circuit 1500 detects the voltage on the first resistor R1 and/or the second resistor R2, and determines whether the detected voltage on the first resistor R1 and/or the second resistor R2 exceeds the predetermined scale of maximum tolerance voltage on the first resistor R1 and/or the second resistor R2 to determine whether the load is heavy. The maximum tolerance voltage on the first resistor R1 and/or the second resistor R2 corresponds to the maximum tolerance load.

If the detected voltage on the first resistor R1 and/or the second resistor R2 exceeds the predetermined scale of the maximum tolerance voltage on the first resistor R1 and/or the second resistor R2, the first switch control circuit 1500 determines the load is heavy, and turns on the first switch Q1 to control the PWM signals to into the control pole of the third switch Q3. If the detected voltage on the first resistor R1 and/or the second resistor R2 does not exceed the predetermined scale of the maximum tolerance voltage on the first resistor R1 and/or the second resistor R2, the first switch control circuit 1500 determines the load is light or there is no loads, and turns off the first switch Q1 to stop inputting the PWM signals into the control pole of the third switch Q3.

In another embodiment, the first switch control circuit 1500 is connected to the feedback circuit 120, detects voltage of a feedback signal of the feedback circuit 120, and determines whether the detected voltage of the feedback signal exceeds maximum tolerance voltage of the feedback signal to determine whether the load is heavy. In this embodiment, the maximum tolerance voltage of the feedback signal corresponds to the maximum tolerance load.

The first switch control circuit 1500 includes a first comparator 1501 and a second comparator 1502 both including a non-inverting input, an inverting input, and an output. The inverting input of the first comparator 1501 receives the detected voltage via a third resistor R3, that is, connected to the first resistor R1 or the feedback circuit 120, and connected to the ground via a third capacitor C3. The non-inverting input of the first comparator 1501 receives a first reference voltage Vcc1 via a fourth resistor R4, and is connected to the output of the first comparator 1501 via a third diode D3 and a fifth resistor R5. An anode of the third diode D3 is connected to the non-inverting input of the first comparator 1501, and a cathode of the third diode D3 is connected to the fifth resistor R5. The output of the first comparator 1501 is connected to the control pole of the first switch Q1.

The inverting input of the second comparator 1502 receives a second reference voltage Vcc2. The non-inverting input of the second comparator 1502 receives the detected voltage via a sixth resistor R6, that is, connected to the second resistor R2 or the feedback circuit 120, and is connected to the ground via a fourth capacitor C4. The output of the second comparator 1502 is connected to the inverting input of the first comparator 1501.

Because the voltage on the first resistor R1 and the second resistor R2 is pulse signals, the third resistor R3 and the third capacitor C3 convert the voltage on the first resistor R1 into stable average voltage to compare with the first reference voltage Vcc1. The sixth resistor R6 and the fourth capacitor C4 convert the voltage on the second resistor R2 into stable average voltage to compare with the second reference voltage Vcc2.

In one embodiment, the PWM controller 110 detects the voltage on first resistor R1, and determines whether the detected voltage on the first resistor R1 exceeds the maximum tolerance voltage on the first resistor R1 to determine the state of the load. The PWM controller 110 regulates duty cycles of the PWM signals according to the state of the load and the feedback signal of the feedback circuit 120. If the PWM controller 110 determines the load is heavy, the PWM controller 110 regulates the duty cycles of the PWM signals longer to extend on periods of the second switch Q2 and the third switch Q3. Thus, the master converter circuit 130 and the slave converter circuit 140 can provide enough DC power signals Vo to drive the load. If the load is light or there is no loads, the PWM controller 110 regulates the duty cycles of the PWM signals shorter to shorten the on period of the master converter circuit 130. Thus, the master converter circuit 130 can provide suitable DC power signals Vo to drive the load.

In another embodiment, the PWM controller 110 detects the voltage of the feedback signal of the feedback circuit 120, and determines whether the detected voltage of the feedback signal exceeds the maximum tolerance voltage of the feedback signal to determine the state of the load. Then the PWM controller 110 regulates the duty cycles of the PWM signals according to the state of the load.

In one embodiment, supposing that the maximum tolerance voltage on the first resistor R1 is 5V, the predetermined scale of the load from light to heavy is 40%, the first reference voltage is set to 2V, which is corresponding to the maximum tolerance voltage on the first resistor R1. The predetermined scale of the load from heavy to light is 35%, thus, the second reference voltage is set to be 0.8V, which is corresponding to the maximum tolerance voltage on the second resistor R2.

When the load is light, the slave converter circuit 140 does not work, and the voltage on the second resistor R2 is 0. That is, voltage on the non-inverting input of the second comparator 1502 is 0, which is less than voltage on the inverting input of the second comparator 1502. The second comparator 1502 outputs a low logic level signal. Because the load is light, the actual voltage on the first resistor R1 does not exceeds the maximum tolerance voltage on the first resistor R1, that is, voltage on the inverting input of the first comparator 1501 is less than 2V. Therefore, the voltage on the inverting input of the first comparator 1501 is less than the voltage on the non-inverting input of the first comparator 1501, and the first comparator 1501 output a high logic level signal. Thus, the first switch Q1 turns off, the PWM signals cannot be input into the third switch Q3, and the slave converter circuit 140 does not operate.

When the load change from light to heavy, because the slave converter circuit 140 does not work, the second comparator 1502 still outputs the low logic level signal. The PWM controller 110 regulates the on period of the duty cycles longer, thus, the voltage on the first resistor R1 increases. When the increased voltage on the first resistor R1 is greater than 2V, that is, the voltage on the inverting input of the first comparator 1501 is greater than the voltage on the non-inverting input of the first comparator 1501, the first comparator 1501 outputs a low logic level signal. At this time, the first switch Q1 is turned on, and the PWM signals are input into the control pole of the third switch Q3. The slave converter circuit 140 begins to work. The third diode D3 is turned on, and the second reference voltage Vcc2 of 2V is divided on the fourth resistor R4 and the fifth resistor R5. Thus, the logic level of the output of the first comparator 1501 and the control pole of the first switch Q1 is pulled down, which maintains that the first switch Q1 continuously turns on to make sure the slave converter circuit 140 works continuously when the load is heavy.

When the load change from heavy to light, the PWM controller 110 regulates the on period of the duty cycles of the PWM signals shorter, and the voltage on the first resistor R1 and the second resistor R2 decreases. When the decreased voltage on the second resistor R2 is less than the maximum tolerance voltage on the second resistor R2, the second comparator 1502 outputs the low logic level signal. When the decreased voltage on the first resistor R1 is less than the maximum tolerance voltage on the first resistor R1, the first comparator 1501 outputs the high logic level signal. Thus, the first switch Q1 is turned off, and the slave converter circuit 140 stops working.

Figure 4:
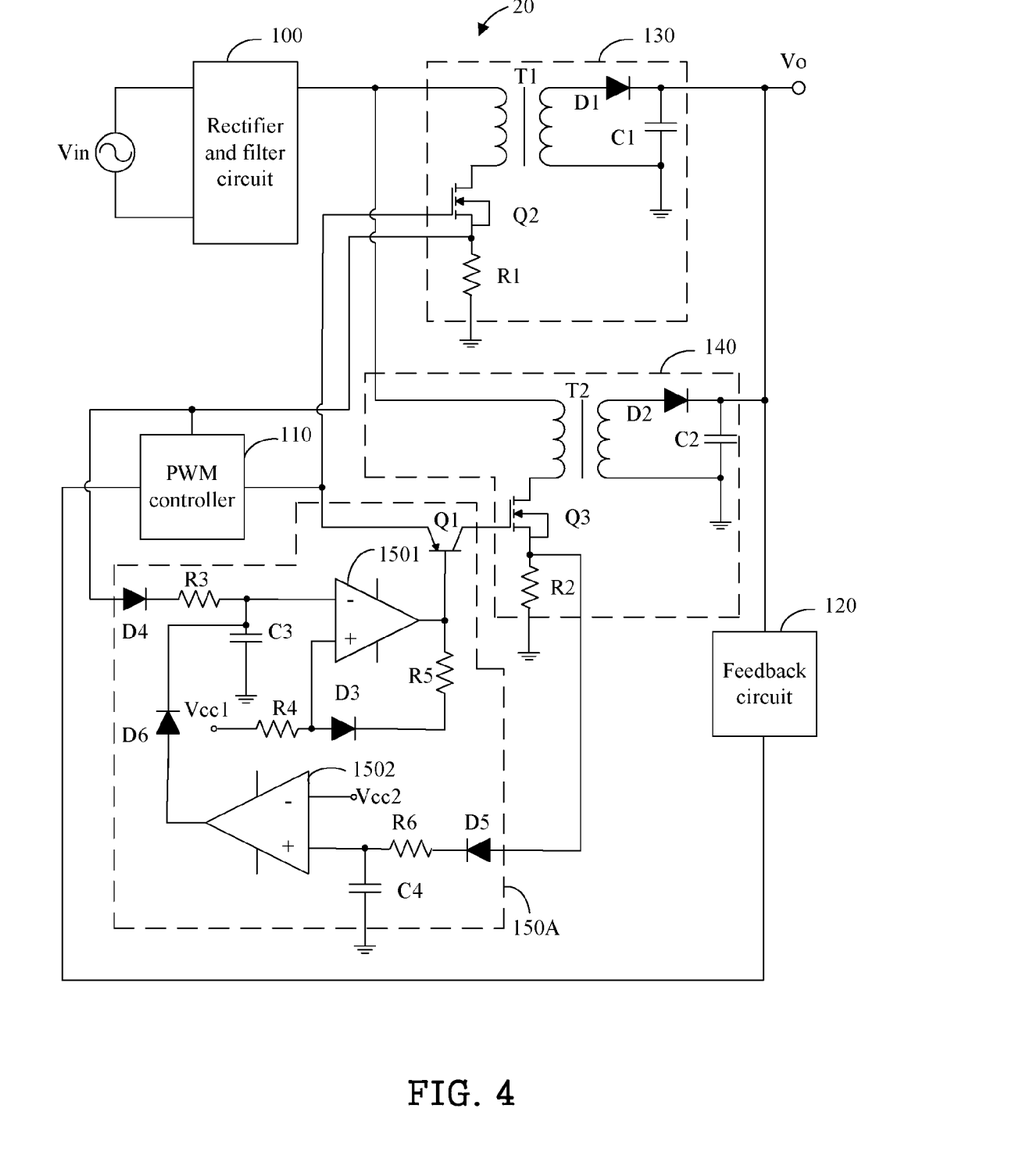
FIG. 4 is a circuit diagram of a second embodiment of a flyback power system as disclosed.

FIG. 4 is a circuit diagram of a second embodiment of a flyback power system 20 as disclosed. The flyback power system 20 is similar to the flyback power system 10 except that a slave converter control circuit 150A of the flyback power system 20 further includes a fourth diode D4, a fifth diode D5, and a sixth diode D6. Descriptions of other similar components of the flyback power system 20 are omitted. An anode of the fourth diode D4 receives the detected voltage, for example, connected to the first resistor R1, and a cathode of the fourth diode D4 is connected to the third resistor R3. An anode of the fifth diode D5 receives the detected voltage, for example, connected to the second resistor R2, and a cathode of the fifth diode D5 is connected to the sixth resistor R6. An anode of the sixth resistor R6 is connected to the output of the second comparator 1502, and a cathode of the sixth diode is connected to the inverting input of the first comparator 1501. The fourth, fifth, and sixth diodes D4, D5, D6 are all used for blocking signals flowing back.

Figure 5:
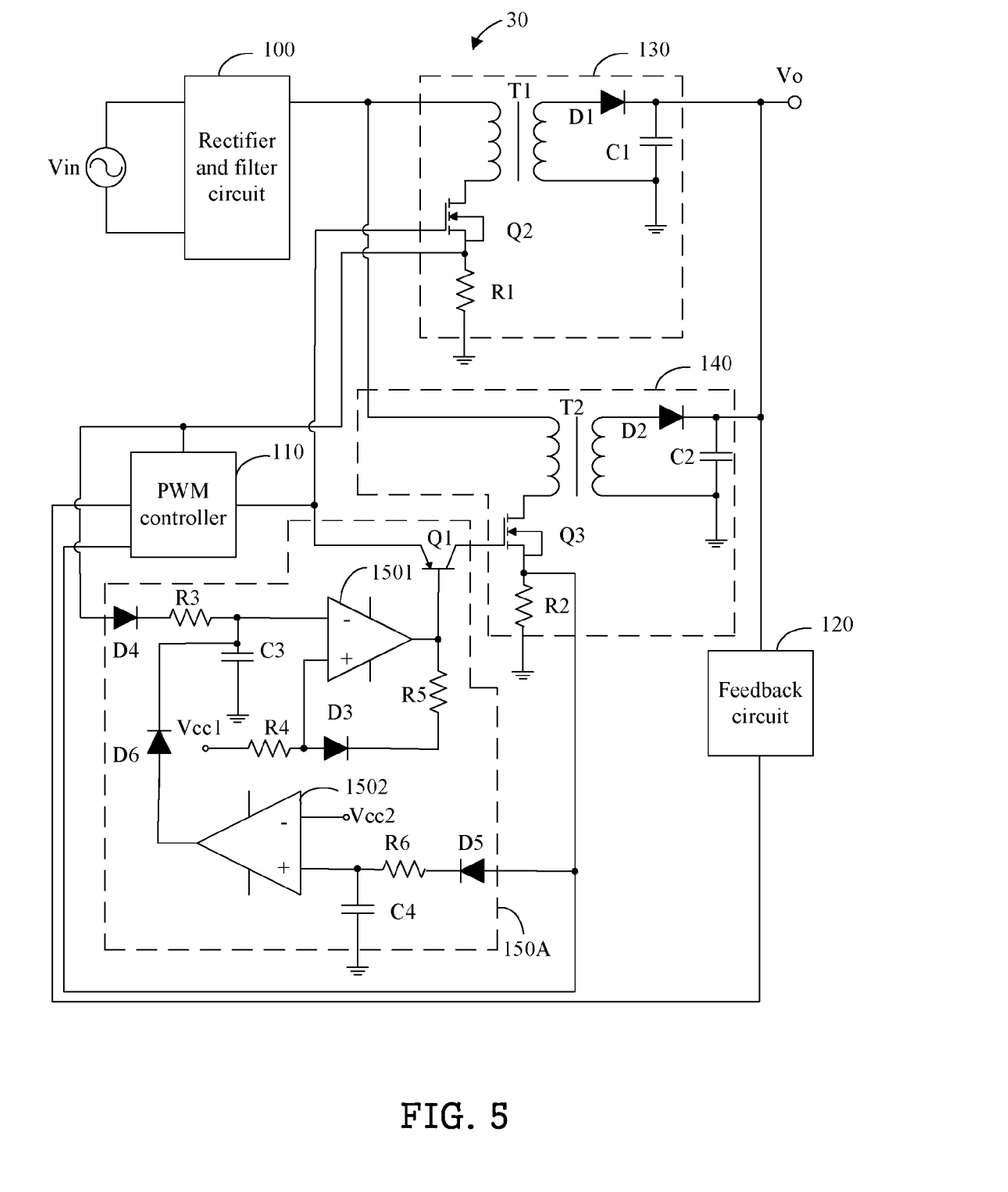
FIG. 5 is a circuit diagram of a third embodiment of a flyback power system as disclosed.

FIG. 4 is a circuit diagram of a third embodiment of a flyback power system 30 as disclosed. The flyback power system 30 is similar to the flyback power systems 10 and 20 except that the PWM controller 110 of the flyback power system 30 is also connected to the second pole of the third switch Q3. Descriptions of other similar components of the flyback power system 30 are omitted. The PWM controller 110 further determines the state of the load according to the voltage on the second resistor R2.

Thus, under control of the slave converter control circuits 150, 150A, the slave converter circuit 140 only works when the load is heavy to commonly drive the load with the master converter circuit 130 to provide enough power. When the load is light or there is no loads, the slave converter circuit 140 does not work, and the master converter circuit 150 drives the load itself. Thus, the flyback power systems 10, 20, 30 have low power loss and high efficiency.

In addition, the flyback power systems 10, 20, 30 use two transformers T1 and T2 to replace a typical transformer, thus, heights of the flyback power systems 10, 20, 30 are decreased, which makes electronic devices utilizing the flyback power systems 10, 20, thin.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A flyback power system, comprising a rectifier and filter circuit, a pulse width modulation (PWM) controller, and a feedback circuit, the flyback power system further comprising:
   a master converter circuit, to convert power signals output from the rectifier and filter circuit into first direct current (DC) power signals to drive a load according to PWM signals of the PWM controller;
   a slave converter circuit, to convert the power signals output from the rectifier and filter circuit into second DC power signals according to the PWM signals of the PWM controller and to superpose the second DC power signals to the first DC power signals to drive the load if the load is heavy; and
   a slave converter control circuit, connected between the PWM controller and the slave converter circuit, and comprising:
      a first switch, comprising a control pole, a first pole, and a second pole, wherein the first pole is connected to the PWM controller, and the second pole is connected to the slave converter circuit; and
      a first switch control circuit, connected to the control pole of the first switch, to detect whether the load is heavy, and to turn on the first switch to control the PWM signals of the PWM controller to input into the slave converter circuit if the load is heavy, or to turn off the first switch to stop inputting the PWM signals of the PWM controller into the slave converter circuit.

2. The flyback power system of claim 1, wherein the master converter circuit comprises:
   a first transformer, comprising a primary winding and a secondary winding;
   a second switch controlled by the PWM signals of the PWM controller; and
   a first resistor, wherein the primary winding of the first transformer, the second switch, and the first resistor are connected in series between an output of the rectifier and filter circuit and the ground in turn.

3. The flyback power system of claim 2, wherein the master converter circuit further comprises:
   a first diode, to rectify power signals from the first transformer, wherein an anode of the first diode is connected to a high voltage terminal of the secondary winding of the first transformer, and a cathode of the first diode outputs the first DC power signals; and
   a first capacitor, connected between the cathode of the first diode and the ground, to filter the power signals from the first transformer.

4. The flyback power system of claim 2, wherein the slave converter circuit further comprises:
   a second transformer, comprising a primary winding and a secondary winding;
   a third switch connected to the slave converter control circuit, to receive and be controlled by the PWM signals of the PWM controller if the switch control circuit turns on the first switch to control the PWM signals to input into the slave converter circuit; and
   a second resistor, wherein the primary winding of the second transformer, the third switch, and the second resistor are connected in series between the output of the rectifier and filter circuit and the ground in turn.

5. The flyback power system of claim 4, wherein the slave converter circuit further comprises:
   a second diode, to rectify power signals from the second transformer, wherein an anode of the second diode is connected to a high voltage terminal of the secondary winding of the second transformer, and a cathode of the second diode outputs the second DC power signals; and
   a second capacitor, connected between the cathode of the second diode and the ground, to filter the power signals from the second transformer.

6. The flyback power system of claim 4, wherein the slave converter control circuit detects voltage of a feedback signal of the feedback circuit, and determines whether the detected voltage exceed a predetermined scale of maximum tolerance voltage of the feedback signal to determine if the load is heavy.

7. The flyback power system of claim 4, wherein the slave converter control circuit detects voltage on the first resistor and/or the second resistor, and determines whether the detected voltage exceed a predetermined scale of maximum tolerance voltage on the first resistor and/or the second resistor to determine if the load is heavy.

8. The flyback power system of claim 7, wherein the first switch control circuit of the slave converter control circuit comprises:
   a first comparator, comprising a non-inverting input, an inverting input, and an output, the inverting input receiving the detected voltage via a third resistor and connected to the ground via a third capacitor, the non-inverting input receiving a first reference voltage via a fourth resistor and connected to the output of the first comparator via a third diode and a fifth resistor, an anode of the third diode connected to the non-inverting input, a cathode of the third diode connected to the fifth resistor, and the output of the first comparator connected to the control pole of the first switch; and
   a second comparator, comprising a non-inverting input, an inverting input, and an output, the inverting input of the second comparator receiving a second reference voltage, the non-inverting input of the second comparator receiving the detected voltage via a sixth resistor and connected to the ground via a fourth capacitor, and the output of the second comparator connected to the inverting input of the first comparator.

9. The flyback power system of claim 8, wherein the first switch control circuit further comprises:
   a fourth diode, an anode of the fourth diode receiving the detected voltage, and a cathode of the fourth diode connected to the third resistor;
   a fifth diode, an anode of the fifth diode receiving the detected voltage, and a cathode of the fifth diode connected to the sixth resistor; and
   a sixth diode, an anode of the sixth diode connected to the output of the second comparator, and a cathode of the sixth diode connected to the inverting input of the first comparator.

10. The flyback power system of claim 8, wherein the inverting input of the first comparator is connected to the first resistor via the third resistor to receive the detected voltage on the first resistor, and the non-inverting input of the second comparator is connected to the second resistor via the sixth resistor to receive the detected voltage on the second resistor.

11. The flyback power system of claim 8, wherein the inverting input of the first comparator is connected to the feedback circuit via the third resistor to receive the detected voltage of the feedback signal, and the non-inverting input of the second comparator is connected to the feedback circuit via the sixth resistor to receive the detected voltage of the feedback signal.

12. The flyback power system of claim 4, wherein the PWM controller determines a state of the load according to voltage on the first resistor, and regulates duty cycles of the PWM signals according to a feedback signal of the feedback circuit and the state of the load.

13. The flyback power system of claim 12, wherein the PWM controller further determines the state of the load according to voltage on the second resistor.

14. The flyback power system of claim 12, wherein the PWM controller regulates the duty cycles of the PWM signals longer if the load is heavy, and regulates the duty cycles of the PWM signals shorter if the load is light or there is no load.

15. The flyback power system of claim 4, wherein the PWM controller determines a state of the load according to voltage of a feedback signal of the feedback circuit, and regulates duty cycles of the PWM signals according to the state of the load.

16. The flyback power system of claim 15, wherein the PWM controller regulates the duty cycles of the PWM signals longer if the load is heavy, and regulates the duty cycles of the PWM signals shorter if the load is light or there is no load.

17. The flyback power system of claim 4, wherein the master converter circuit further comprises:
 a diode, to rectify power signals from the first transformer, wherein an anode of the diode is connected to a high voltage terminal of the secondary winding of the first transformer, and a cathode of the diode outputs the first DC power signals; and
 a capacitor, connected between the cathode of the diode and the ground, to filter the power signals from the first transformer.

18. A flyback power system, for driving a load of a device, the flyback power system comprising a rectifier and filter circuit, a pulse width modulation (PWM) controller, and a feedback circuit, the flyback power system further comprising:
 a master converter circuit, to continuously convert power signals output from the rectifier and filter circuit into first direct current (DC) power signals to drive the load according to PWM signals of the PWM controller when the flyback power system is powered on;
 a slave converter circuit, to convert the power signals output from the rectifier and filter circuit into second DC power signals according to the PWM signals of the PWM controller and to superpose the second DC power signals to the first DC power signals to drive the load when the load is heavy; and
 a slave converter control circuit, connected between the PWM controller and the slave converter circuit, to detect whether the load is heavy, and to control the PWM signals of the PWM controller to input into the slave converter circuit if the load is heavy to make the slave converter circuit drive the load commonly with the master converter circuit, or to stop inputting the PWM signals of the PWM controller into the slave converter circuit if the load is light or there is no load to make the master converter circuit independently drive the load.

19. The flyback power system of claim 18, wherein the slave converter control circuit detects current flowing through the load, and determines whether the detected current exceed a predetermined scale of maximum tolerance current flowing through the load to determine if the load is heavy.

20. The flyback power system of claim 18, wherein the load comprises backlight lamps; and if the backlight lamps and a predetermined number of circuits of the device are working, the load is heavy.

* * * * *